United States Patent
Niwa

(10) Patent No.: US 10,720,822 B2
(45) Date of Patent: Jul. 21, 2020

(54) POWER TOOL AND METHOD OF FORMING COIL IN POWER TOOL MOTOR

(71) Applicant: MAKITA CORPORATION, Anjo-shi, Aichi (JP)

(72) Inventor: Akira Niwa, Anjo (JP)

(73) Assignee: MAKITA CORPORATION, Anjo (JP)

( * ) Notice: Subject to any disclaimer, the term of this patent is extended or adjusted under 35 U.S.C. 154(b) by 291 days.

(21) Appl. No.: 15/609,501

(22) Filed: May 31, 2017

(65) Prior Publication Data

US 2018/0034354 A1    Feb. 1, 2018

(30) Foreign Application Priority Data

Jul. 29, 2016  (JP) .................................. 2016-150348

(51) Int. Cl.
| | | |
|---|---|---|
| *H02K 3/34* | (2006.01) | |
| *H02K 29/12* | (2006.01) | |
| *H02K 3/52* | (2006.01) | |
| *H02K 3/32* | (2006.01) | |
| *H02K 9/06* | (2006.01) | |
| *H02K 29/08* | (2006.01) | |
| *H02K 7/14* | (2006.01) | |

(52) U.S. Cl.
CPC ............. *H02K 29/12* (2013.01); *H02K 3/325* (2013.01); *H02K 3/345* (2013.01); *H02K 3/522* (2013.01); *H02K 9/06* (2013.01); *H02K 29/08* (2013.01); *H02K 7/145* (2013.01)

(58) Field of Classification Search
CPC ...................................................... H02K 3/345
See application file for complete search history.

(56) References Cited

U.S. PATENT DOCUMENTS 4,543,708 A * 10/1985 Matsubara ............... H02K 3/12
29/598

FOREIGN PATENT DOCUMENTS

| JP | 2001-268835 A | 9/2001 |
|---|---|---|
| JP | 2008-054391 A | 3/2008 |
| JP | 2015-056953 A | 3/2015 |

OTHER PUBLICATIONS

Feb. 3, 2020 Office Action issued in Japanese Patent Application No. 2016-150348.

* cited by examiner

*Primary Examiner* — Ramon M Barrera
(74) *Attorney, Agent, or Firm* — Oliff PLC

(57) ABSTRACT

In a brushless motor comprising a stator core having a plurality of teeth that protrude therefrom in radial directions, a front insulator which is attached to the stator core and which has a plurality of insulating portions that protrude therefrom along the direction of protrusion of the respective teeth, and a plurality of coils formed by magnet wire wound about each of the insulating portions at the respective teeth, a top face of the respective insulating portions of the front insulator is provided in advance with a deformable rib which is capable of being deformed by tension of the magnet wire wound thereabout, and the magnet wire is wound about the deformable rib to form the coils as the deformable rib is made to deform in correspondence to the external shape of the magnet wire.

12 Claims, 15 Drawing Sheets

POWER TOOL AND METHOD OF FORMING COIL IN POWER TOOL MOTOR

BACKGROUND OF THE INVENTION

This application claims the benefit of Japanese Patent Application Number 2016-150348 filed on Jul. 29, 2016, the entirety of which is incorporated by reference.

TECHNICAL FIELD

The present invention relates to a power tool and to a method of forming a coil in a stator of a wound motor which may be used in an impact driver or other power tools.

BACKGROUND ART

In impact drivers and other power tools, those in which brushless motors are employed as drive source are known. As indicated at Japanese Patent Application Publication No. 2008-54391, a brushless motor is equipped with a rotor having a rotating shaft, and a stator which has insulators (insulating members) made of resin at front and back end faces in the axial direction and which has a plurality of coils formed by winding. The coils are formed by magnet wire which is wound a plurality of times about the outer periphery of T-shaped teeth provided at the stator and about insulating portions provided at the insulator. The insulating portions are of the same shape as the teeth.

In such a brushless motor, U-shaped grooves of the same diameter as the magnet wire are formed in continuous fashion at surfaces of the insulating portions of the insulator, and the magnet wire is neatly wound as a result of causing the magnet wire to be wound about the surfaces in correspondence to the U-shaped grooves.

However, when magnet wire of different diameters is to be wound about the surfaces, such magnet wire cannot be accommodated by insulating portions having U-shaped grooves of a single diameter. Therefore, it is necessary to prepare a plurality of insulators having U-shaped grooves corresponding to the diameters of the magnet wire, causing increase in cost and presenting an inconvenience in terms of management. Furthermore, high precision is required at the equipment used to carry out winding of magnet wire because the winding of the magnet wire must be done in correspondence to the U-shaped grooves. Therefore, the necessary adjustments are troublesome and time-consuming.

It is therefore an object of the present invention to provide a power tool and a method of forming a coil in a power tool motor that will make it possible to carry out winding of wire of different diameters without having to prepare a plurality of insulators in correspondence to diameters of wire, and that will make it possible even where the precision with which winding is carried out is poor to cause magnet wire to be neatly wound.

SUMMARY

To achieve the foregoing object, one embodiment of the present invention is a method of forming a coil in a power tool motor.

The power tool motor may comprises a stator core having a plurality of teeth that protrude therefrom in radial directions, an insulator which is attached to the stator core and which has a plurality of insulating portions that protrude therefrom along the direction of protrusion of the respective teeth, and a plurality of coils formed by wire wound about each of the insulating portions at the respective teeth.

In the method, at least a portion of a surface about which the wire is wound at the respective insulating portions of the insulator may be provided in advance with a deformable portion which is capable of being deformed by tension of the wire wound thereabout.

Further, in the method, the wire may be wound about the deformable portion to form the coils as the deformable portion is made to deform in correspondence to the external shape of the wire.

Furthermore, it is preferred that the deformable portion be a deformable rib provided in erect fashion along the direction of protrusion of the insulating portion.

Furthermore, it is preferred that the deformable rib be provided to be paired in erect fashion such that there is prescribed spacing therebetween in a width direction of the insulating portion.

Furthermore, it is preferred that a recess, at which a wall thickness of the insulating portion is less than at a portion outside of the deformable ribs, be formed between the deformable ribs.

Furthermore, it is preferred that cross-sectional shapes of the deformable ribs be such that angular portions at which corners are apparent are formed at mutually outward sides at the top ends thereof, and radiused portions at which edges are not apparent are formed at mutually inward sides at the top ends thereof.

Furthermore, it is preferred that the deformable rib be formed in such fashion that thickness thereof gradually increases as progress is made in a direction in which the wire is neatly wound thereover.

Furthermore, it is preferred that the deformable portion be a thin-walled portion provided at the surface about which the wire is wound.

Furthermore, it is preferred that the thin-walled portion be formed from a resin material which is different from that of the insulating portions.

Furthermore, it is preferred that the insulator be one of two thereof that are attached to the two ends of the stator core, and that the deformable portion be at least provided at one of the two insulators.

Another embodiment of the present invention to achieve the foregoing object is a power tool that may be equipped with a drive source in the form of a motor comprising a stator core having a plurality of teeth that protrude therefrom in radial directions, an insulator which is attached to the stator core and which has a plurality of insulating portions that protrude therefrom along the direction of protrusion of the respective teeth, and a plurality of coils formed by wire wound about each of the insulating portions at the respective teeth.

In the power tool, at least a portion of a surface about which the wire is wound at the respective insulating portions of the insulator may be provided with a deformable portion which is capable of being deformed by tension of the wire wound thereabout. Further, in the machine tool, the coils may be formed in a state such that a portion of the deformable portion at which the wire is wound thereabout has been made to deform in correspondence to the external shape of the wire.

Another embodiment of the present invention to achieve the foregoing object is a power tool that may be equipped with a drive source in the form of a motor comprising a stator core having a plurality of teeth that protrude therefrom in radial directions, an insulator which is attached to the stator core and which has a plurality of insulating portions that protrude therefrom along the direction of protrusion of the respective teeth, and a plurality of coils formed by wire wound about each of the insulating portions at the respective teeth.

In the machine tool, at least a portion of a surface about which the wire is wound at the respective insulating portions of the insulator may be provided with a deformable rib which is capable of being deformed by tension of the wire wound thereabout and which is provided in erect fashion along the direction of protrusion of the insulating portions.

Further, in the machine tool, the coils may be formed in a state such that a portion of the deformable rib at which the wire is wound thereabout has been made to deform in correspondence to the external shape of the wire.

Where this is the case, it is preferred that the deformable rib be provided to be paired in erect fashion such that there is prescribed spacing therebetween in a width direction of the insulating portion.

Another embodiment of the present invention to achieve the foregoing object is a power tool that may be equipped with a drive source in the form of a motor comprising a stator core having a plurality of teeth that protrude therefrom in radial directions, an insulator which is attached to the stator core and which has a plurality of insulating portions that protrude therefrom along the direction of protrusion of the respective teeth, and a plurality of coils formed by wire wound about each of the insulating portions at the respective teeth.

In the machine tool, at least a portion of a surface about which the wire is wound at the respective insulating portions of the insulator may be provided with a deformable portion which is capable of being deformed by tension of the wire wound thereabout and which is formed in such fashion that thickness thereof gradually increases as progress is made in a direction in which the wire is neatly wound thereover.

Further, in the machine tool, the coils may be formed in a state such that a portion of the deformable portion at which the wire is wound thereabout has been made to deform in correspondence to the external shape of the wire.

In accordance with the present invention, there is no need to prepare a plurality of insulators in correspondence to diameters of wire, and it is therefore possible with only a single insulator to carry out winding of wire of different diameters. Furthermore, because the wire digs into the deformable portions irrespective of the diameter of the wire, it is possible even where the precision with which winding is carried out is poor to cause the wire to be neatly wound thereover.

DETAILED DESCRIPTION

Embodiments of the present invention are described below with reference to the drawings.

Figure 1:
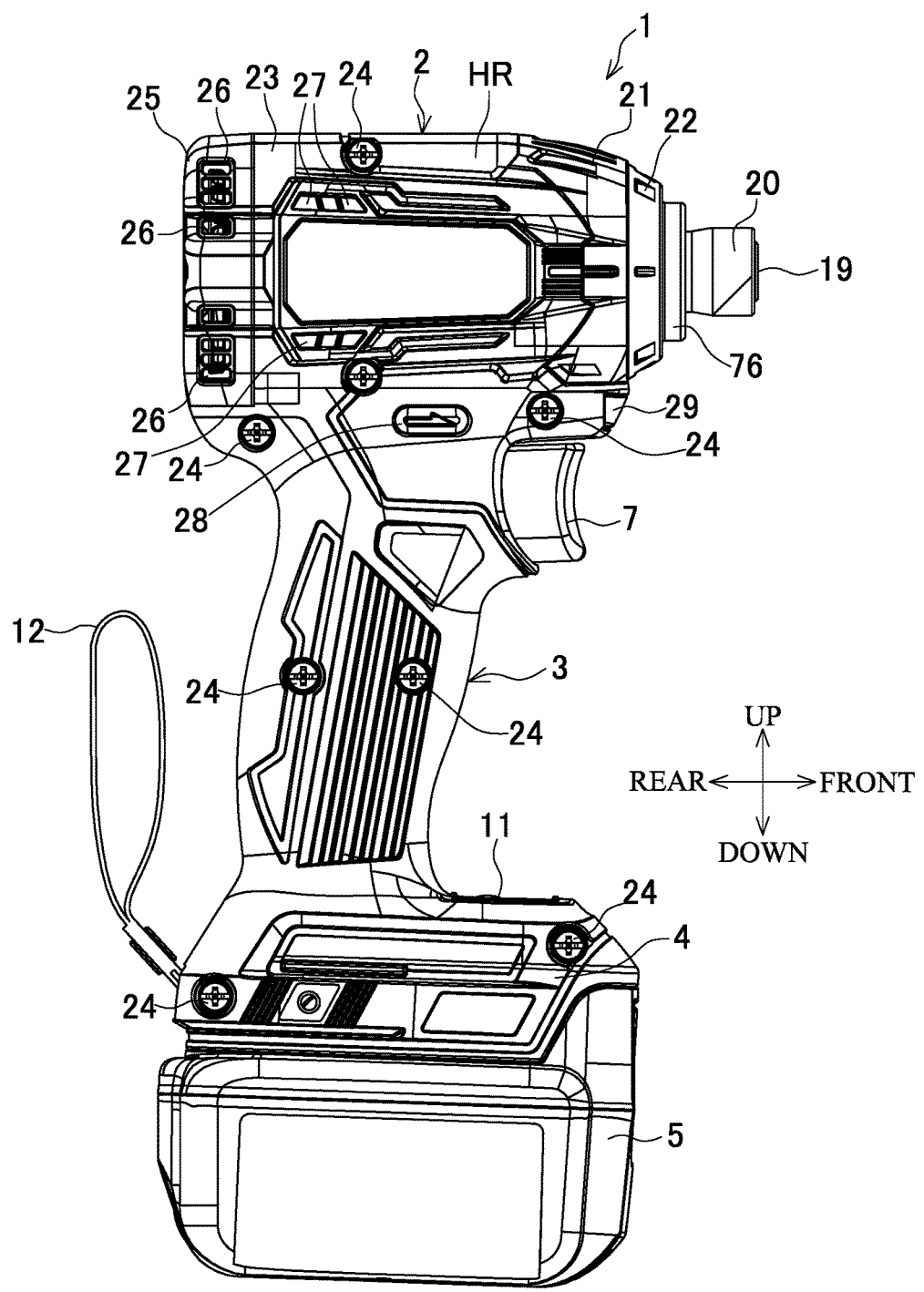
FIG. 1 is a side view of an impact driver.
Figure 2:
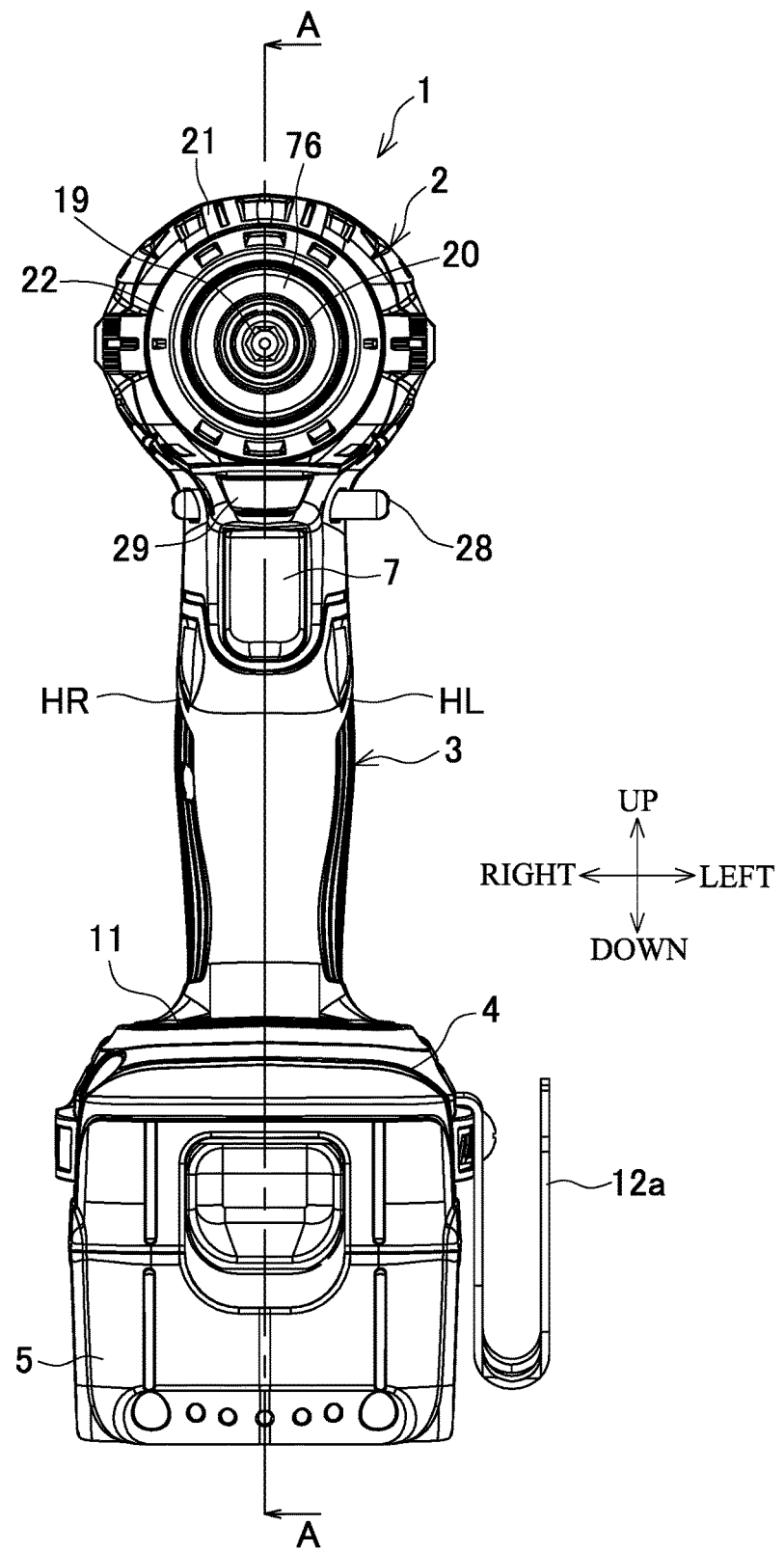
FIG. 2 is a front view of an impact driver.
Figure 3:
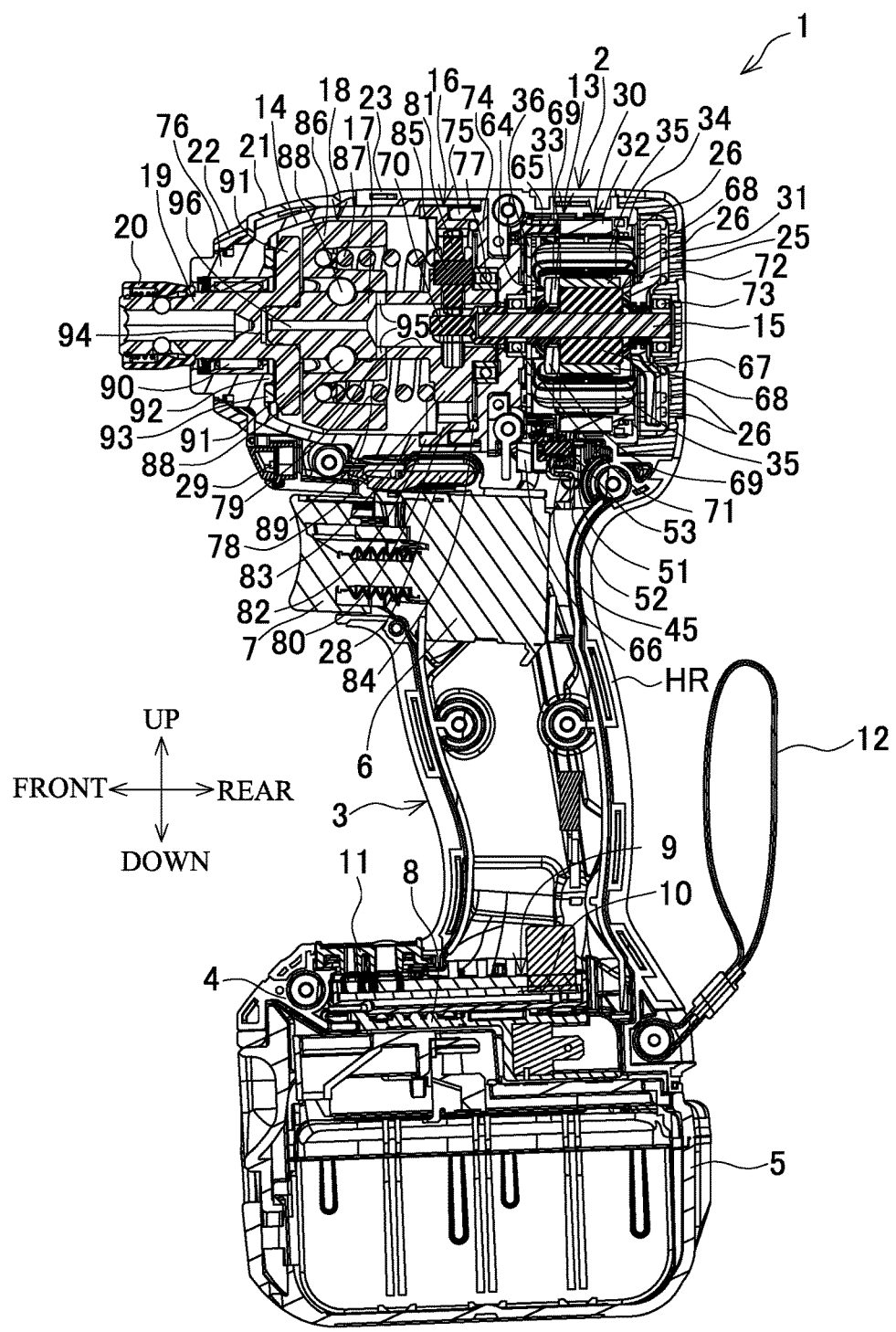
FIG. 3 is a sectional view of section A-A in FIG. 2.
Figure 4A:
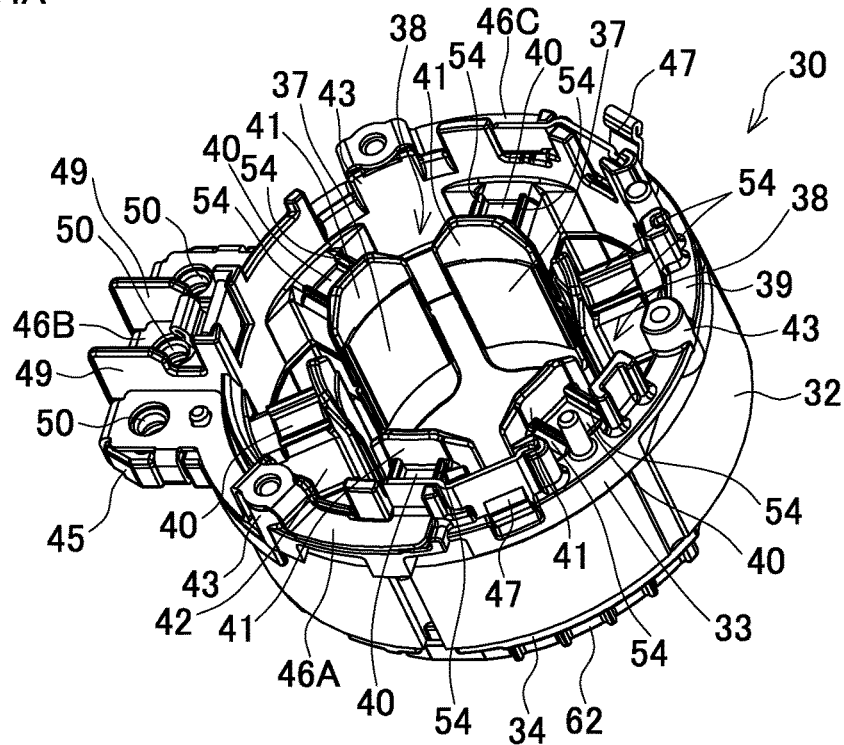
FIGS. 4A and 4B are perspective views of a stator as seen from above.
Figure 4B:
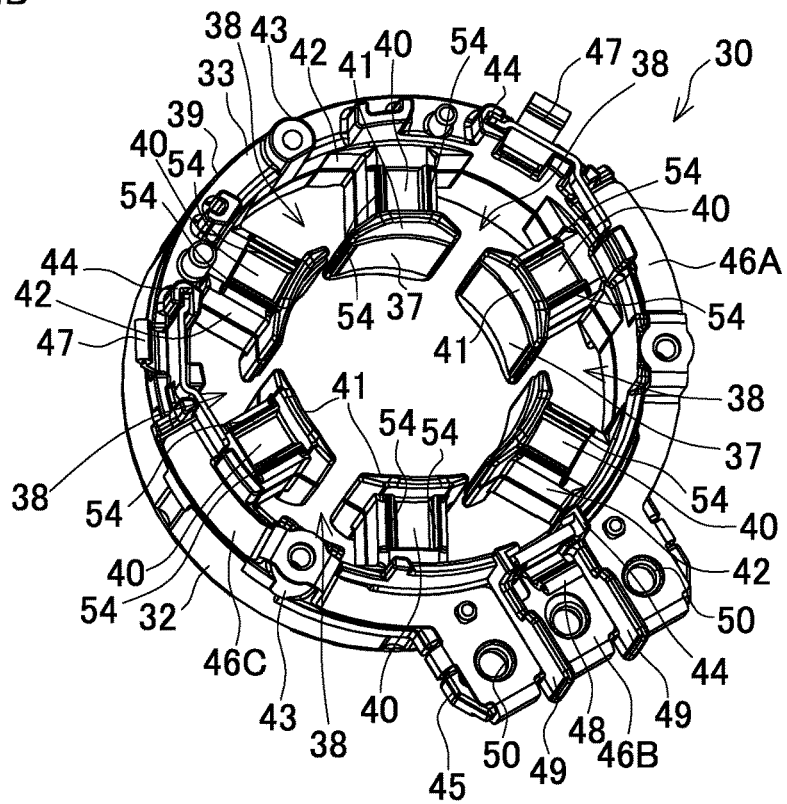

FIG. 1 is a side view of an impact driver which is an example of a power tool, FIG. 2 is a front view thereof, and FIG. 3 is a sectional view of section A-A in FIG. 2.

An impact driver 1 has a main body portion 2 in which a central shaft defines a front-to-back direction, and a grip portion 3 which protrudes below the main body portion 2, a battery pack 5 serving as a power source being installed in a battery installation portion 4 which is provided at the bottom end of the grip portion 3. An upper portion of the grip portion 3 houses a switch 6 from which a trigger 7 protrudes toward the front. The battery installation portion 4 is provided with a terminal block 8 which is electrically connected to the battery pack 5 and a controller 9 having a control circuit board 10 on which a microcomputer or the like is mounted. Further, the battery installation portion 4 is provided with a switch panel 11 having a pushbutton which is operational to change rotational velocity and a display unit showing a remaining battery charge. A strap 12 is provided, and a hook for hanging 12a is secured by screw(s) to the left side of the battery installation portion 4.

A brushless motor 13 serving as a power tool motor and a hammer case 14 are housed in the main body portion 2 in order from the back. At the interior of the hammer case 14, there are provided a planetary reduction gear mechanism 16, a spindle 17, a hammering mechanism 18, and an anvil 19. The planetary reduction gear mechanism 16 reduces rotational velocity of a rotational shaft 15 of the brushless motor 13. The rotational velocity of the spindle 17 is reduced by the planetary reduction gear mechanism 16. The hammering mechanism 18 adds hammering action to the rotation of the spindle 17. The anvil 19 serves as a final output shaft and protrudes toward the front from the front end of the main body portion 2. At the tip of the anvil 19, a sleeve 20 for removable attachment of bit(s) is provided. A cover 21 which is made of resin and a bumper 22 which is made of rubber are respectively mounted at the exterior of the front portion of the hammer case 14 which is behind the sleeve 20.

The rear half of the main body portion 2 has a cylindrical motor housing 23 which houses the brushless motor 13 and which is integral with the grip portion 3. The motor housing 23 and the grip portion 3 are formed by using a plurality of screws 24, 24, . . . to assemble a pair of, i.e., left and right, split housings HR, HL. At the back end of the motor housing 23, a cap-like rear cover 25 in which air exhaust holes 26, 26, . . . are formed at the side(s) is attached by a bell-and-spigot joint and by screw(s), not shown, from the rear. At the side(s) of the motor housing 23 at location(s) toward the front from the rear cover 25, air intake holes 27, 27, . . . are formed. A motor reversing lever 28 is provided between the switch 6 and the hammer case 14, and an LED 29 is provided toward the front therefrom and illuminates the region in front of the anvil 19.

The brushless motor 13 is of the inner-rotor type and has a stator 30 and a rotor 31. As shown in FIGS. 4A, 4B, and 5A to 5D, the stator 30 has a stator core 32, a front insulator 33 and a rear insulator 34 which are provided to the front and rear of the stator core 32, a plurality (one pair for each of U phase, V phase, and W phase, for a total of six shown here) of coils 35, 35, . . . which are formed by winding magnet wire about the stator core 32 such that the front insulator 33 and the rear insulator 34 intervene therebetween, and a sensor circuit board 36 which is attached to the front insulator 33. Note that FIGS. 4A, 4B, and 5A to 5D show the situation that exists before formation of respective coils 35, 35, . . . and before attachment of the sensor circuit board 36.

The stator core 32 is formed by lamination of pluralities of steel plates, and six T-shaped teeth 37, 37, . . . are provided at the inner periphery thereof in axially directed and evenly spaced protruding fashion such that six slots 38, 38, . . . are formed between the respective teeth 37, 37, . . . .

As shown in FIGS. 6 and 7A to 7D, the front insulator 33 is equipped with a ring portion 39 and six insulating portions 40, 40. The ring portion 39 is made of resin, and the outside diameter of the ring portion 39 is approximately the same as that of the stator core 32. The six insulating portions 40, 40, . . . , which are T-shaped as viewed from the front, are located at the fronts of the respective teeth 37 and are formed in radial direction(s) on the inner periphery of the ring portion 39. An upwardly projecting portion is formed in integral fashion at the tip of each insulating portion 40. The upwardly projecting portion 41 projects upwardly in trapezoidally shaped fashion as viewed from the front from a location at the center of the ring portion 39 and which is curved so as to conform to the shape of the exterior of the rotor 31. Six engagement ribs 42, 42, . . . , which engage with the respective slots 38, are formed at the back of the front insulator 33. The engagement ribs 42, 42, . . . extend along the inner rims of the insulating portions 40, 40, . . . which are adjacent in the circumferential direction. Further, the engagement ribs 42, 42, . . . extend along the left and right ends of the upwardly projecting portions 41 and the inner rim of the ring portion 39.

Furthermore, at the front of the ring portion 39, three screw bosses 43, 43, . . . for securing the sensor circuit board 36 by means of screws are provided in protruding fashion. The three screw bosses 43, 43, . . . are evenly spaced in the circumferential direction so as to be located at the vertices of an equilateral triangle. Three retaining portions 44, 44, . . . which retain crimping portions 47, 48 of fusing terminals 46A to 46C, described below, are provided in erect fashion between the respective screw bosses 43, 43, . . . . Moreover, at the lower portion of the ring portion 39, a linking piece 45 which protrudes downwardly therefrom is formed in integral fashion.

At the front of the ring portion 39, three fusing terminals 46A to 46C are provided so as to make connection to lead wires which serve as electric power lines for the coils 35 of the respective phases. Left and right fusing terminals 46A and 46C extend in arcuate fashion so as to conform to the shape of the ring portion 39. In addition, the bottom ends of the fusing terminals 46A and 46C are bent downward to extend along the left and right sides of the linking piece 45, and are bent about and anchored to the linking piece 45. At the top ends of the respective fusing terminals 46A and 46C, the crimping portions 47 for crimping and fusing of lead wires are respectively provided. The crimping portions 47 are retained by the retaining portions 44.

The central fusing terminal 46B has, at the top end thereof, the crimping portion 48 which is retained by the retaining portion 44 centrally located on the linking piece 45, and extends along the central portion of the linking piece 45. Then, the bottom end of the fusing terminal 46B is bent about and anchored to the linking piece 45.

At the front of the linking piece 45, partitioning ribs 49, 49 are provided in erect fashion so as to form partitions between the respective fusing terminals 46A to 46C. Nuts 50, 50, . . . corresponding to the respective fusing terminals 46A to 46C are respectively embedded in the respective regions partitioned by the partitioning ribs 49.

A terminal unit 51 (FIG. 3) which is C-shaped as viewed from the side is attached to the linking piece 45 so as to straddle the linking piece 45 from below. To the terminal unit 51, lead wires 52, which are routed from the control circuit board 10 and correspond to the respective fusing terminals 46A to 46, are soldered. In such state, the terminal unit 51 and the linking piece 45 are mutually joined and electrically connected by means of screws 53, 53, . . . which pass through the respective fusing terminals 46A to 46C and which are threadedly engaged with the respective nuts 50.

In addition, at each insulating portion 40 of the front insulator 33, a pair of deformable ribs 54, 54 serving as deformable portions are provided at the front thereof which constitutes a surface about which the magnet wire forming coil 35 is wound. As shown in FIGS. 8A, 8B, 9A and 9B, these deformable ribs 54 are formed as protrusions that are provided at both ends in the direction of the width of the insulating portion 40 and extend at a constant height along the direction of protrusion of the insulating portion 40. Each of the deformable rib 54 extends from a location somewhat away from the base of the insulating portion 40 toward the upwardly projecting portion 41 until it abuts the upwardly projecting portion 41. A recess 55, at which the wall thickness of the insulating portion 40 is less than at the portions outside of the deformable ribs 54, 54, is formed between the two deformable ribs 54, 54. Furthermore, the cross-sectional shapes of the respective deformable ribs 54 are such that angular portions 56 at which corners (edges) are apparent are formed at mutually outward sides at the top ends thereof, and radiused portions 57 at which edges are not apparent are formed at mutually inward sides at the top ends thereof.

Figure 5A:
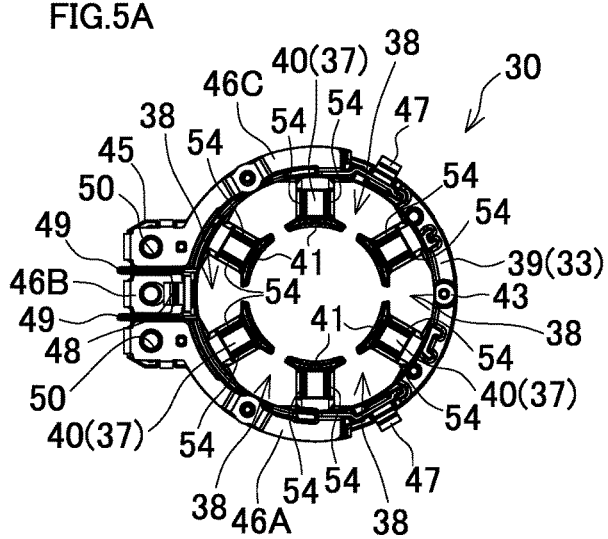
FIGS. 5A to 5D are drawings to assist in describing a stator, FIG. 5A showing a plan view thereof, FIG. 5B showing a side view thereof, FIG. 5C showing a bottom view thereof, and FIG. 5D showing a front view thereof.
Figure 5B:
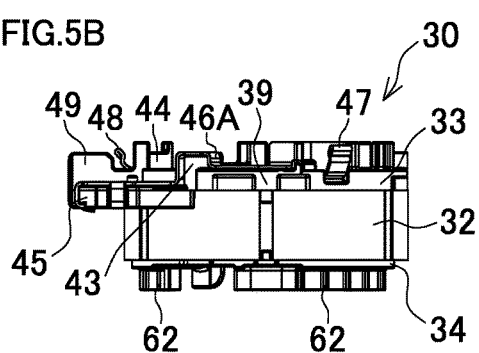
Figure 5D:
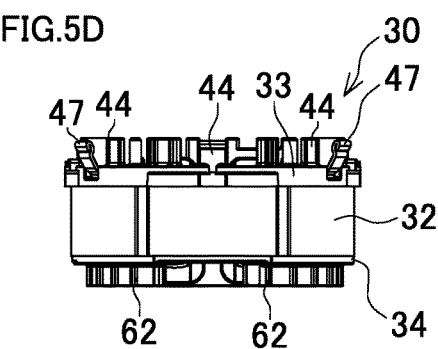
Figure 5C:
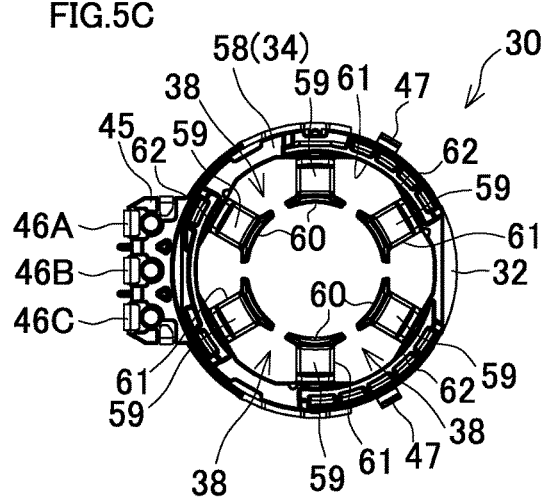
Figure 6:
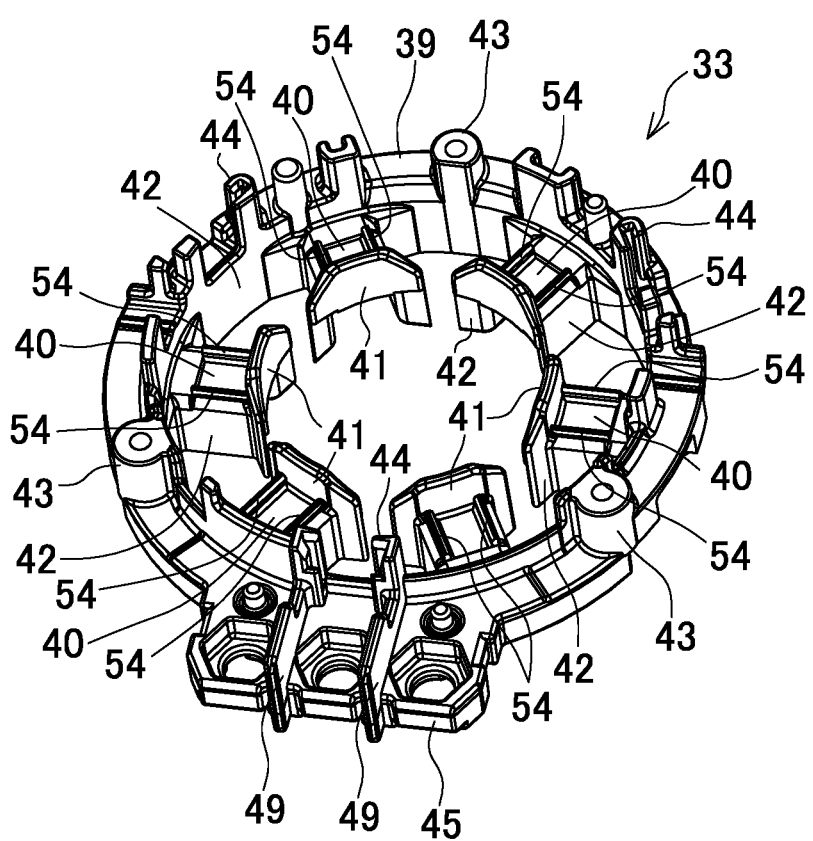
FIG. 6 is a perspective view of a front insulator.
Figure 7A:
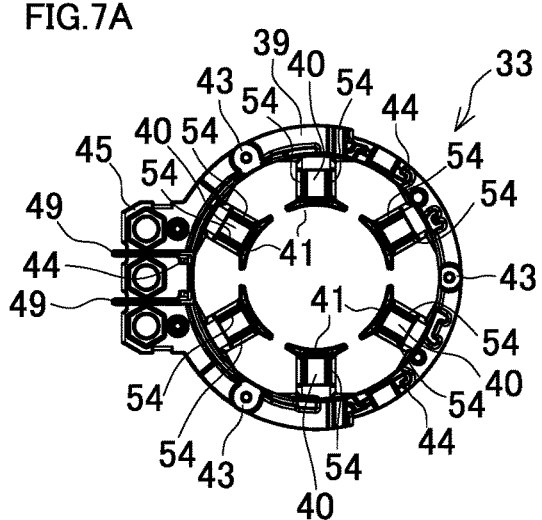
FIGS. 7A to 7D are drawings to assist in describing a front insulator, FIG. 7A showing a plan view thereof, FIG. 7B showing a side view thereof, FIG. 7C showing a bottom view thereof, and FIG. 7D showing a front view thereof.
Figure 7B:
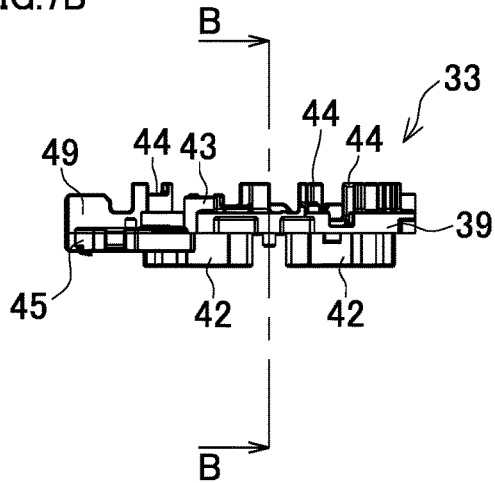
Figure 7D:
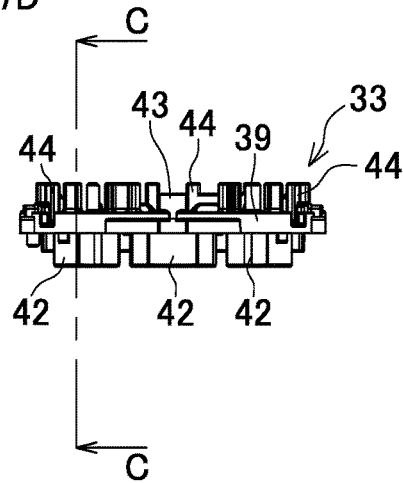
Figure 7C:
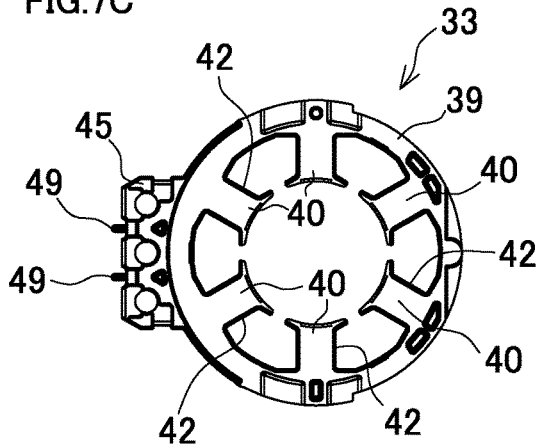

As shown at FIG. 5C, the rear insulator 34 is likewise equipped with the ring portion 58 and six insulating portions 59, 59, . . . . The ring portion 58 is made of resin and the outside diameter thereof is approximately the same as that of the stator core 32. The six insulating portions 59, 59, . . . are located at the backs of the respective teeth 37 of the stator core 32 and are formed in radial direction(s) on the inner periphery of the ring portion 58. At the tip of each insulating portion 59, an upwardly projecting portion 60 is formed in integral fashion. The upwardly projecting portion 60 projects upwardly in trapezoidally shaped fashion as viewed from the front from a location at the center of the ring portion 58, and is curved so as to conform to the shape of the outside of the rotor 31. Six engagement ribs 61, 61, . . . , which engage with the respective slots 38, are formed at the back of the rear insulator 34. The engagement ribs 61, 61, . . . extend along the inner rims of the insulating portions 59, 59 which are adjacent in the circumferential direction. Further, the engagement ribs 61, 61, . . . extend along the left and right ends of the upwardly projecting portions 60 and the inner rim of the ring portion 58. Except for the faces at the ends in the center which oppose the rotor 31, the respective teeth 37 are therefore covered by the front and back insulators 33, 34.

The coils 35, 35, . . . are wound such that one pair each of U phase, V phase, and W phase respectively located along the diagonal are wound. Crossover wires which mutually connect adjacent phases are routed via the front insulator 33 and are crimped at the crimping portions 47, 48 of the respective fusing terminals 46A to 46C. Furthermore, the crossover wires mutually connecting pairs of the coils 35, 35 of each phase are routed via the rear insulator 34. Guidewalls 62 which guide the crossover wires are provided in erect fashion at the ring portion 58 of the rear insulator 34.

Methods of forming the respective coils 35 at the stator 30 are now described.

Figure 8A:
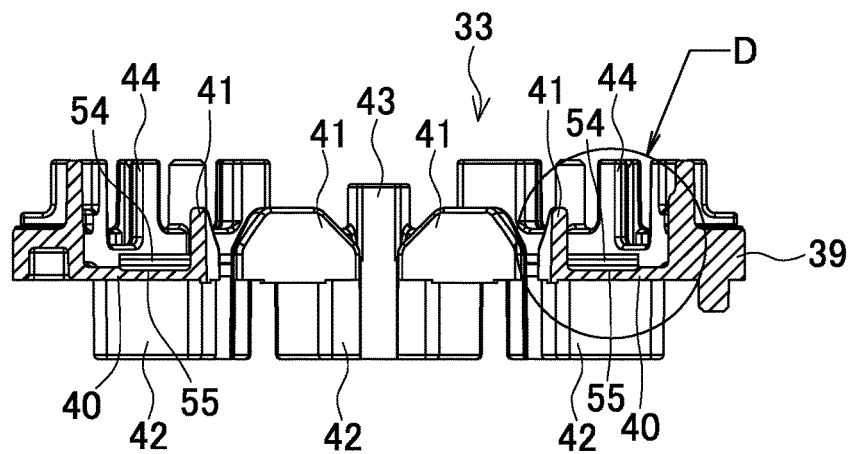
FIG. 8A is a sectional view of section B-B in FIG. 7B.
Figure 8B:
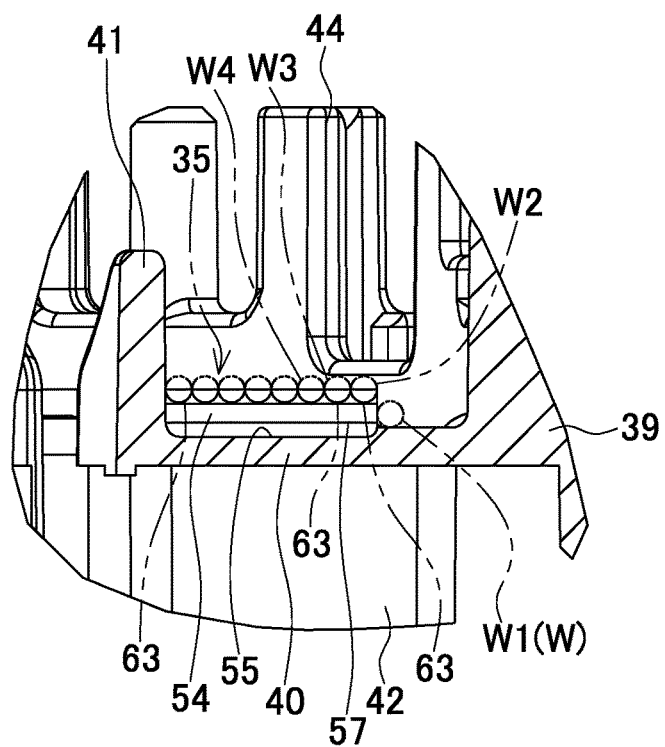
FIG. 8B is an enlarged view of region D of FIG. 8A.

As shown at FIG. 8B, a first winding W1 of magnet wire W is wound from a location outside the deformable ribs 54, 54 at the base of the insulating portion 40 of the front insulator 33. That is, the deformable ribs 54, 54 are used for positioning of the first winding W1. In addition, from a second winding W2, the magnet wire W is wound over the deformable ribs 54, 54 in crosswise fashion with respect thereto. An adjacent third winding W3, a fourth winding W4, . . . then are wound in order as progress is made toward the upwardly projecting portion 41. Whereas the deformable ribs 54, 54 exist as protrusions at the time of molding of the front insulator 33, winding of the magnet wire W at prescribed tension causes the magnet wire W to plastically deform the deformable ribs 54, 54 and dig into the deformable ribs 54, 54.

In a state where a first layer of the magnet wire W has been wound to reach the upwardly projecting portion 41, U-shaped grooves 63, 63, . . . , which conform to the external shape of the magnet wire W, are formed continuously at the top faces of the deformable ribs 54, 54. At the time that the magnet wire W is being wound, because the angular portions 56 are formed at the outsides of the deformable ribs 54, the load from the magnet wire W tends to act in concentrated fashion on the deformable ribs 54. Therefore, the deformable ribs 54 are plastically deformed without dislocation. Where a second or second and subsequent layers of windings are to be carried out, these would be wound in order over the first layer of the magnet wire W starting from the upwardly projecting portion 41 side.

Figure 9A:
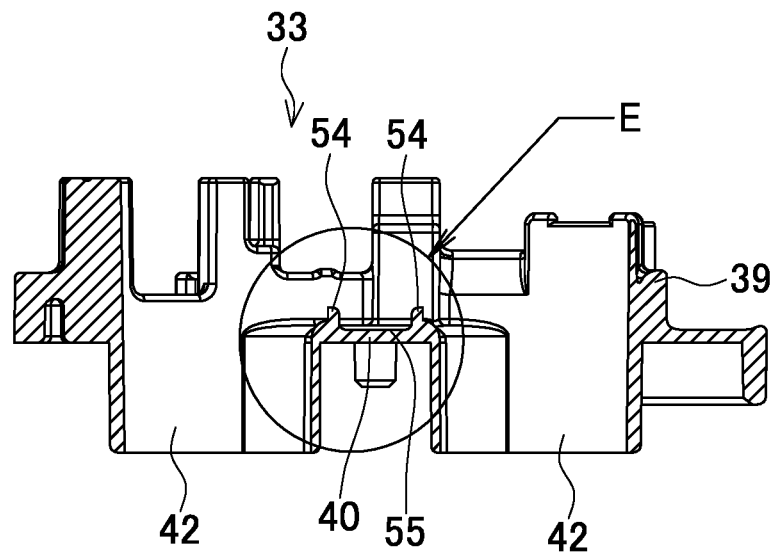
FIG. 9A is a sectional view of section C-C in FIG. 7D.
Figure 9B:
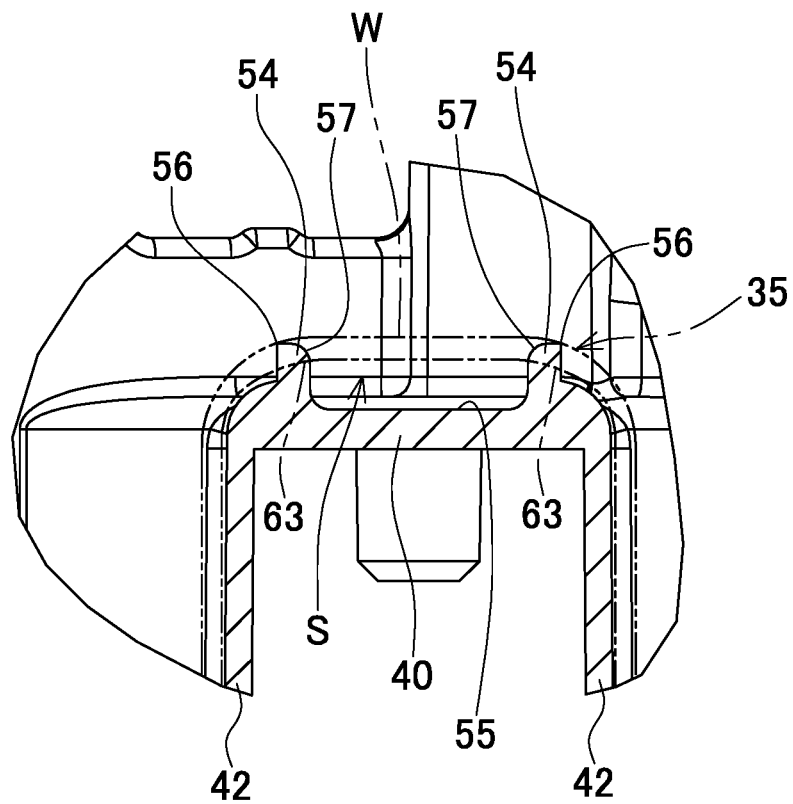
FIG. 9B is an enlarged view of region E of FIG. 9A.
Figure 10A:
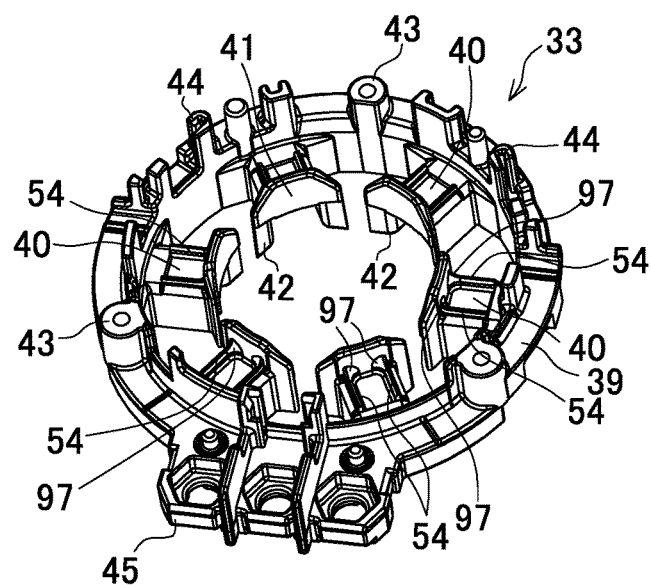
FIGS. 10A to 10C are drawings to assist in describing a variation on a front insulator, FIG. 10A showing a perspective view thereof, FIG. 10B showing a plan view thereof, and FIG. 10C showing a side view thereof.
Figure 10B:
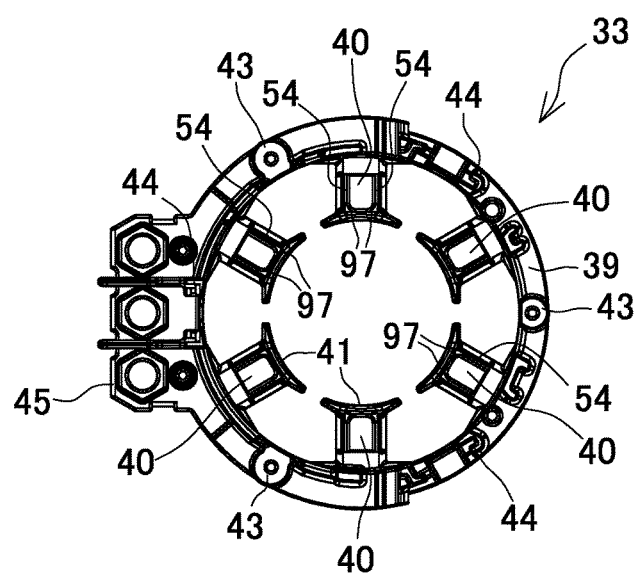
Figure 10C:
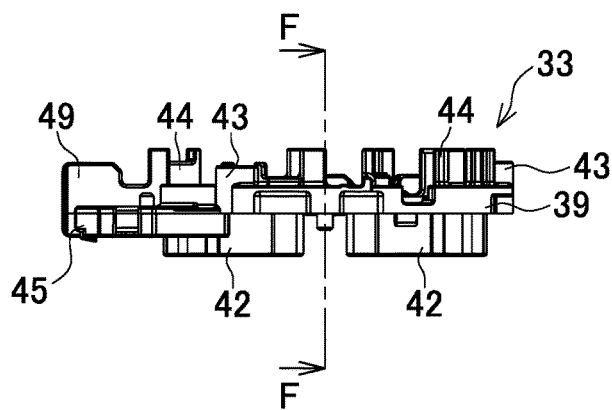
Figure 11A:
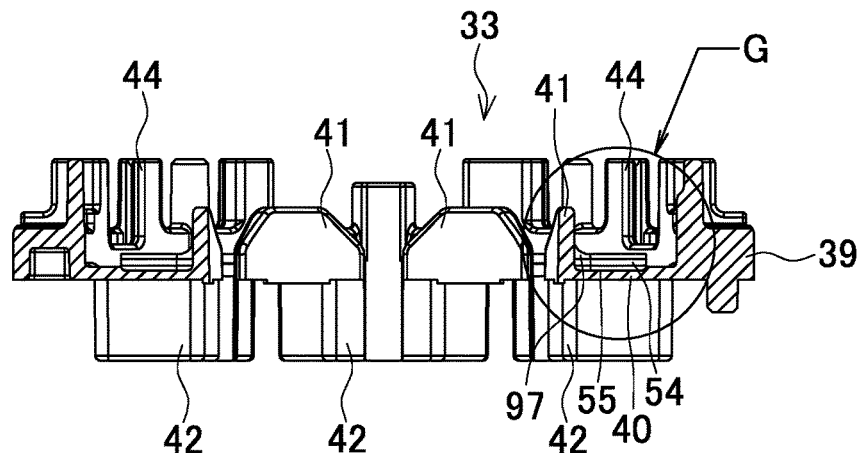
FIG. 11A is a sectional view of section F-F in FIG. 10C.
Figure 11B:
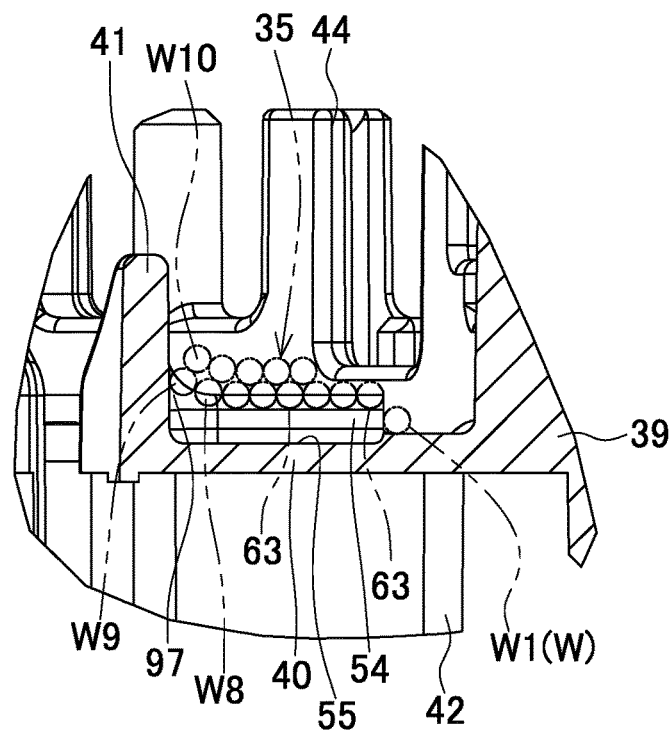
FIG. 11B is an enlarged view of region G of FIG. 11A.
Figure 12:
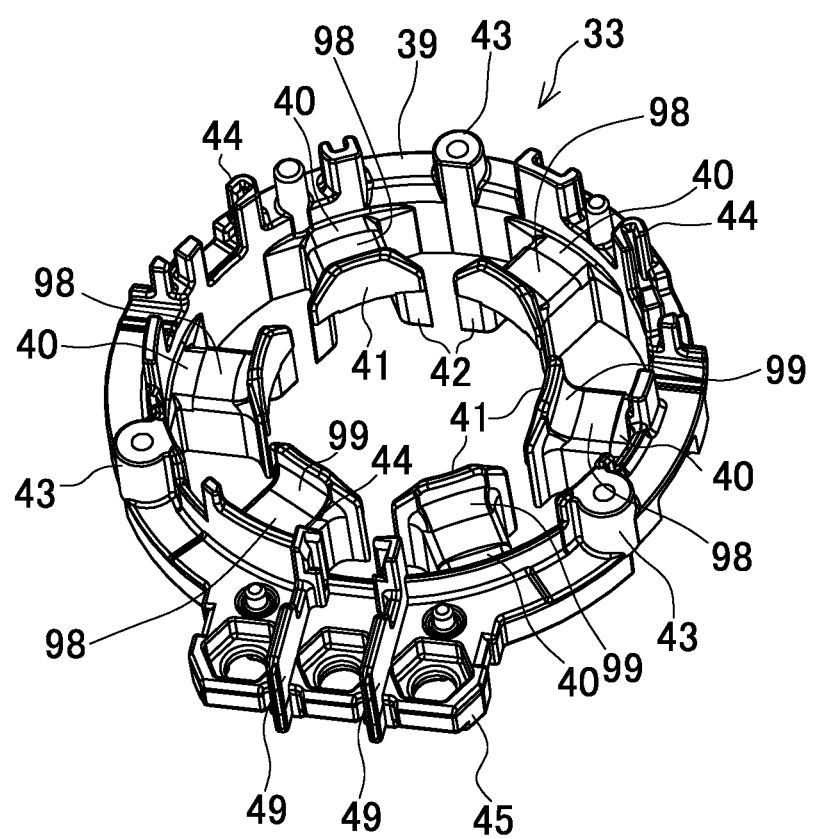
FIG. 12 is a perspective view of a variation on a front insulator.
Figure 13A:
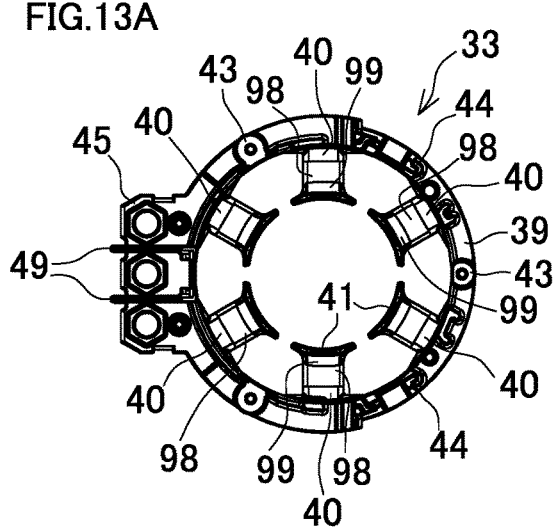
FIGS. 13A to 13D are drawings to assist in describing a variation on a front insulator, FIG. 13A showing a plan view thereof, FIG. 13B showing a side view thereof, FIG. 13C showing a bottom view thereof, and FIG. 13D showing a front view thereof.
Figure 13B:
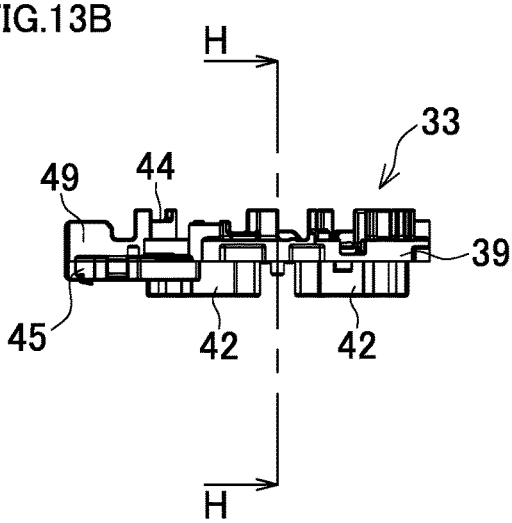
Figure 13D:
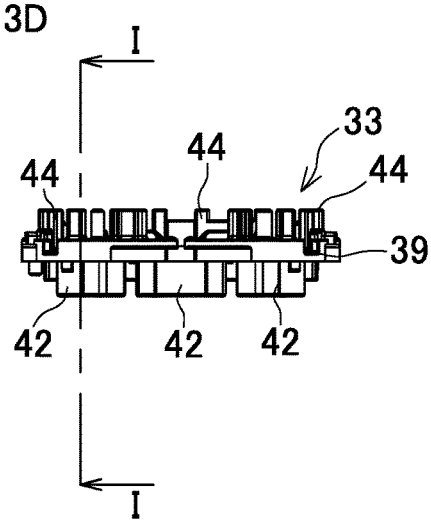
Figure 13C:
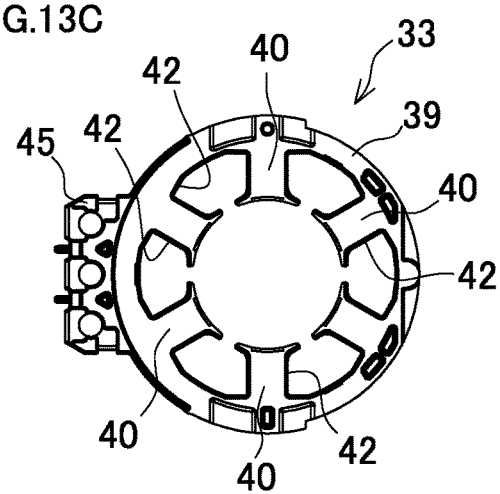

As shown at FIG. 9B, the state that is obtained after causing the magnet wire W to be wound in such fashion is such that vent spaces S extending in radial direction(s) are formed between the magnet wire W and the recess 55 of the insulating portions 40.

The sensor circuit board 36 is disk-like in shape and has a through-hole formed in the center thereof, and an outside diameter thereof is approximately the same as that of the ring portion 39 of the front insulator 33. The sensor circuit board 36 is equipped with three rotation detection elements 64, 64, . . . at the back thereof and is secured by means of screws 65, 65, . . . from the front to the screw bosses 43 of the front insulator 33. Simultaneous herewith, the fusing terminals 46A and 46C which are located between the sensor circuit board 36 and the screw bosses 43 are secured thereto by means of screws. At the bottom end of the sensor circuit board 36, a connection portion 66 (FIG. 3) is provided so as to protrude downwardly at the same phase as the linking piece 45. From the connection portion 66, signal lines from the rotation detection elements 64 emerge.

The rotor 31 has the rotational shaft 15 which is located at the axis thereof, a cylindrical rotor core 67 which is arranged peripherally about the rotational shaft 15, cylindrical permanent magnets 68, 68 which are arranged toward the outside from the rotor core 67 with alternating polarity in the circumferential direction, and a plurality of sensor permanent magnets 69, 69 arranged radially toward the front from the foregoing components. A pinion 70 is attached to the front end of the rotational shaft 15, and a bearing 71 is assembled in rear of the pinion 70. A centrifugal fan 72 is attached to the back end of the rotational shaft 15, and a bearing 73 is assembled in rear of the centrifugal fan 72. The bearing 73 is retained by the rear cover 25.

Moreover, the front end of the rotational shaft 15 protrudes toward the front so as to pass through a bearing retainer 74 which is retained by the motor housing 23 at the front of the brushless motor 13, and the bearing 71 is retained by the bearing retainer 74. A ring wall 75 is provided in protruding fashion so as to be directed toward the front at the front perimeter of the bearing retainer 74, and has a male threaded portion at the outside periphery thereof. The back end of the hammer case 14 is screwed into the ring wall 75 to close the back portion of the hammer case 14. The hammer case 14 is a metal cylindrical body, the front half of which tapers to become narrower, and a front cylindrical portion 76 is formed at the front end of the hammer case 14 and meshes with the interior surface of the motor housing 23, so that rotation of the hammer case 14 is prevented.

Furthermore, at the front portion of the bearing retainer 74, the back end of the spindle 17 is supported by way of a bearing 77. The spindle 17 has a disc-shaped carrier portion 78, the portion to the rear of which is hollow, and is such as to allow the pinion 70 of the rotational shaft 15 to protrude into a blind hole 79 formed along the axis from the back thereof.

The planetary reduction gear mechanism 16 comprises an internal gear 80 having internal teeth, and three planetary gears 81, 81, . . . having external teeth that mesh with the internal gear 80. The internal gear 80 has a large-diameter portion 82 at the outer periphery side at the front portion thereof. The large-diameter portion 82 meshes with the inner circumferential surface of the hammer case 14 so that the internal gear 80 is prevented from rotating, and the large-diameter portion 82 is constrained such that movement is only permitted in the axial direction between a step 83 provided at the inner periphery of the hammer case 14 and the ring wall 75. An O-ring 84 intervenes between the front of the bearing retainer 74 and the back end of the internal gear 80 at the interior of the ring wall 75. The O-ring seals the space between the bearing retainer 74 and the internal gear 80 and also dampens impact exerted on the bearing retainer 74 by the internal gear 80.

The Planetary gears 81 are supported by pins 85 so as to permit rotation within the carrier portion 78, and mesh with the pinion 70 of the rotational shaft 15.

The hammering mechanism 18 comprises a hammer 86 which is mounted at the exterior of the spindle 17, and a coil spring 87 which exerts a restoring force that tends to cause the hammer 86 to move toward the front. The hammer 86 has a pair of dogs (not shown) at the front thereof, and is coupled to the spindle 17 by way of intervening balls 88, 88 that are straddled by and engage with an inside cam groove formed at the surface of the spindle 17 and an outside cam groove formed at the inner surface thereof. Furthermore, a ring-shaped groove 89 is formed at the back of the hammer 86, and the front end of the coil spring 87 is inserted herein. The back end of the coil spring 87 abuts the front of the carrier portion 78.

The anvil 19 is supported by a bearing 90 which is retained by the front cylindrical portion 76 of the hammer case 14, and a pair of arms 91, 91 that engage in the rotational direction with the dogs of the hammer 86 are formed at the back end thereof. A ring-like projection 92 is provided in protruding fashion at the inner periphery side at the back of the front cylindrical portion 76 at a location in front of the arms 91, 91. A washer 93 which is made of resin and which supports the arms 91, 91 is installed at the outside of the projection 92.

Furthermore, a mating hole 94 is formed axially at the back of the anvil 19, and the front end of the spindle 17 is inserted thereinto in coaxial fashion. First communication holes 95, 95 are formed at the spindle 17 so as to extend in radial direction(s) and cause the blind hole 79 to be in communication with the inner circumferential surface of the hammer 86, and a second communication hole 96 is formed axially so as to causes the blind hole 79 to be in communication with the mating hole 94. Therefore, grease within the blind hole 79 is permitted to be supplied to the interior of the mating hole 94 and the inner circumferential surface of the hammer 86.

At the impact driver 1 constituted as described above, the stator 30 of the brushless motor 13 is assembled together with the rotor 31 coaxially with the main body portion 2 such that the linking piece 45 is downwardly oriented within the motor housing 23. The lead wires 52 which are connected by way of the terminal unit 51 to the linking piece 45 are therefore routed in downwardly directed fashion behind the switch 6 to pass through the interior of the grip portion 3 and make connection with the control circuit board 10. Here, because the lead wires 52 and the sensor circuit board 36 are both secured by means of screw(s), screwing operations can be carried out simultaneously when assembling these at the motor housing 23. As a result, there is no longer a need for operations in which the lead wires 52 are soldered or the like in advance, provided only that fusing of the coils 35 be carried out.

Switching element(s) for carrying out switching for electrification of the coils 35 are mounted on the control circuit board 10, and signal lines for making connection with the connection portion 66 of the sensor circuit board 36 from the control circuit board 10 are routed via the interior of the grip portion 3 after passing through the region behind the switch 6 from the connection portion 66.

At the impact driver 1, when the trigger 7 is depressed and the switch 6 is turned ON, electricity is supplied to the brushless motor 13 by way of the lead wires 52, causing the rotational shaft 15 to rotate. That is, the control circuit board 10 of the controller 9 obtains rotation detection signal(s) indicating position(s) of the sensor permanent magnet(s) 69 at the rotor 31 which are output from the rotation detection element(s) 64 of the sensor circuit board 36 to acquire the rotational state of the rotor 31. Then, the control circuit board 10 controls the ON/OFF behavior of the respective switching elements in correspondence to the acquired rotational state, and causes electric current to flow to the respective coils 35 of the stator 30 in order, so that the rotational shaft 15 rotates together with the rotor 31.

Upon so doing, the planetary gear 81 which meshes with pinion 70, engages in orbital motion within the internal gear 80, and the spindle 17 is made to rotate at reduced speed as a result of intervention of the carrier portion 78 therebetween. The hammer 86 therefore also rotates, causing the anvil 19 to rotate by way of intervening the arms 91, 91 which are engaged with the dogs, making it possible for a screw to be tightened by the bit. As tightening of the screw proceeds and the torque at the anvil 19 increases, the hammer 86 is retracted as the restoring force of the coil spring 87 is overcome while the balls 88, 88 are made to roll along the inside cam groove at the spindle 17. When the dogs are released from the arms 91, 91, the restoring force from the coil spring 87 together with guiding by the inside cam groove cause the hammer 86 to rotate as it advances and to again cause the dogs to engage with the arms 91, 91, as a result of which the anvil 19 is made to generate a rotational hammering force (impact). This is then repeated to permit further tightening.

In addition, when the centrifugal fan 72 rotates in accompaniment to rotation of the rotational shaft 15, air drawn thereinto from the air intake holes 27 at the front side travels through and cools the brushless motor 13 and is thereafter discharged from the exhaust holes 26 at the back. When traveling through the brushless motor 13, air that has entered thereinto from the air intake holes 27 passes through through-hole(s) at the inside and outside of the sensor circuit board 36 to reach the interior of the stator 30, and passes between the stator 30 and the rotor 31 and through the slots 38 between the coils 35, 35 to reach the centrifugal fan 72. Therefore, cooling of the coils 35 is also made possible.

Here, at the respective insulating portions 40 of the front insulator 33, because the vent spaces S are formed between the recesses 55 of the insulating portions 40 and the magnet wire W, air passing through the space between the stator 30 and the rotor 31 also enters the vent spaces S. The coils 35 can therefore be cooled more effectively.

Thus, in accordance with the impact driver 1 and the method of forming the coils 35 in the brushless motor 13 at the foregoing embodiment, a portion of the surfaces about which the magnet wire W is wound at the respective insulating portions 40 of the front insulator 33 are provided in advance with the deformable portions (deformable ribs 54, 54) which are capable of being deformed by the tension of the magnet wire W wound thereabout. Further, the magnet wire W is wound about the deformable ribs 54, 54 to form the coils 35 as the deformable ribs 54, 54 are made to deform in correspondence to the external shape of the magnet wire W. Therefore, there is no need to prepare a plurality of the front insulators 33 in correspondence to diameters of the magnet wire W. It is possible with only a single front insulator 33 to carry out winding of the magnet wire W of different diameters. Furthermore, because the magnet wire W digs into the deformable ribs 54 irrespective of the diameter of the magnet wire W, it is possible even where the precision with which winding is carried out is poor to cause the magnet wire W to be neatly wound thereover.

In particular, because the deformable portion employed herein is a deformable rib 54 that is provided in erect fashion along the direction of protrusion of the insulating portion 40, it is possible to easily form a deformable portion that plastically deforms as a result of action of the tension from the magnet wire W.

Furthermore, because a pair of the deformable ribs 54 are provided in erect fashion such that there is prescribed spacing therebetween in the direction of the width of the insulating portion 40, it is possible to cause the magnet wire W which is wound thereabout to definitively dig thereinto and be neatly wound thereover.

Moreover, whereas in the foregoing embodiment the deformable rib was made to have the constant height at all locations along its length, as shown in FIGS. 10A, 10B, 11A and 11B, it is possible to form a sloped portion 97 at which height gradually increases in continuous fashion as one approaches the upwardly projecting portion 41 from a point in front of the upwardly projecting portion 41.

As described above, the deformable rib 54 is formed such that the thickness thereof gradually increases as progress is made in the direction in which the magnet wire W is neatly thereover, it is possible to increase the area of the portion that connects the insulating portion 40 and the upwardly projecting portion 41, making it possible to prevent deformation in a direction such as would cause the upwardly projecting portion 41 to bend toward the rotor 31. Furthermore, because the end of the first layer (the eighth winding W8 and the ninth winding W9 at FIG. 11B) of the magnet wire W wound about the sloped portion 97 digs into the deformable rib 54 at gradually higher locations, the beginning of the second layer (the tenth winding W10) of the magnet wire W wound thereabout is wound starting from a location which is removed from the upwardly projecting portion 41. It will therefore be possible to reduce the load acting in a direction tending to cause the upwardly projecting portion 41 to bend toward the rotor 31. The sloped portion 97 need not be curved but may incline in planar fashion.

Furthermore, the deformable portion is not limited to being rib-shaped. It is possible as shown in FIGS. 12, 13A to 13D, 14A, 14B, 15A and 15B to take a form of a thin-walled portion 98 formed with prescribed thickness at the top face of the insulating portion 40. So that the thin-walled portion 98 will undergo deformation when acted upon by the tension of the magnet wire W, the same resin material as at the front insulator 33 is not employed thereat, a resin material that more easily undergoes plastic deformation being employed instead. In such case, both resin materials might be combined and injection molded (multicolor injection molding) at the same time, or a sheet-like thin-walled portion 98 which has been separately molded might be made to adhere to the surface of the insulating portion 40 of the front insulator 33 that has been molded in advance. At the thin-walled portion 98 as well, a sloped portion 99 is formed at which height gradually increases as one approaches the upwardly projecting portion 41 from a point in front of the upwardly projecting portion 41.

Figure 14A:
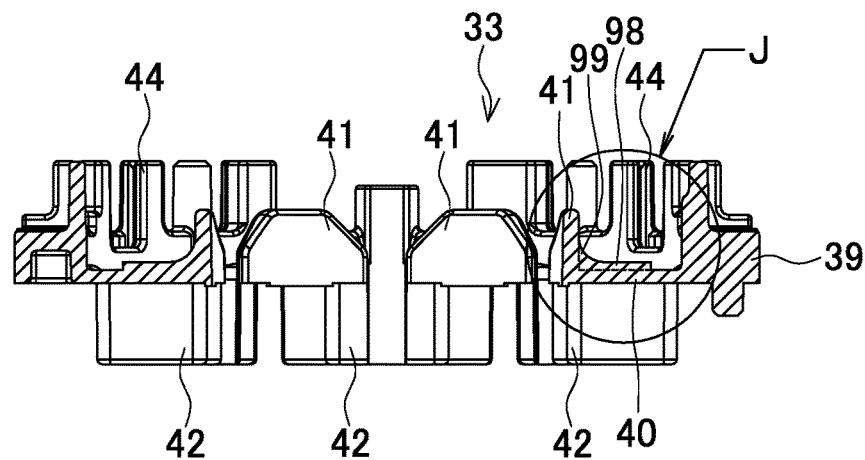
FIG. 14A is a sectional view of section H-H in FIG. 13B.
Figure 14B:
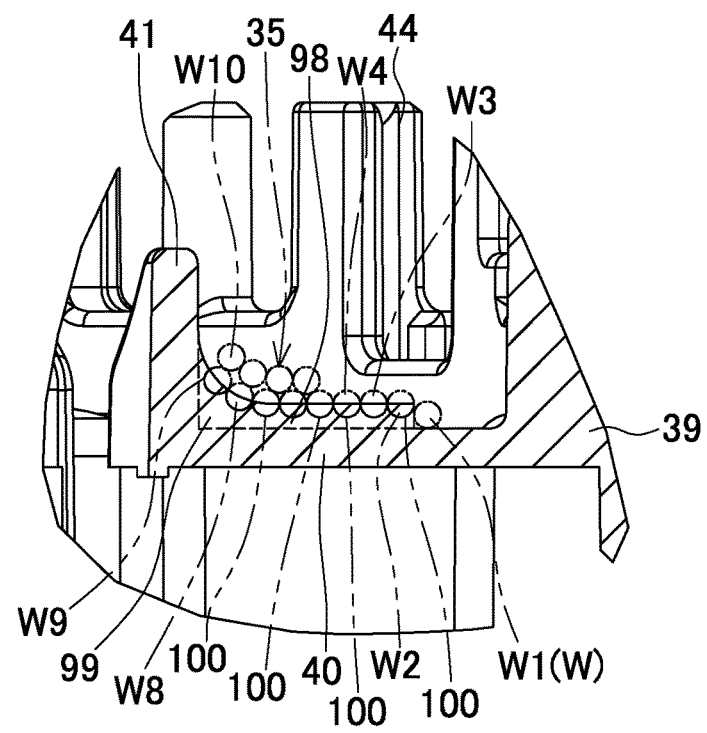
FIG. 14B is an enlarged view of region J of FIG. 14A.
Figure 15A:
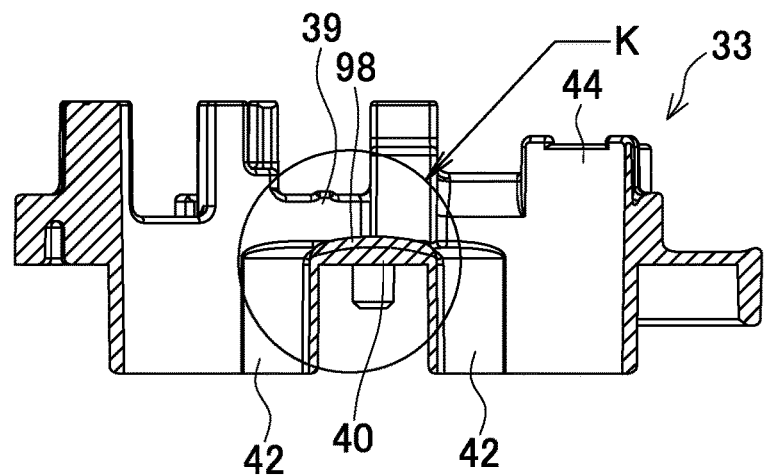
FIG. 15A is a sectional view of section I-I in FIG. 13D.
Figure 15B:
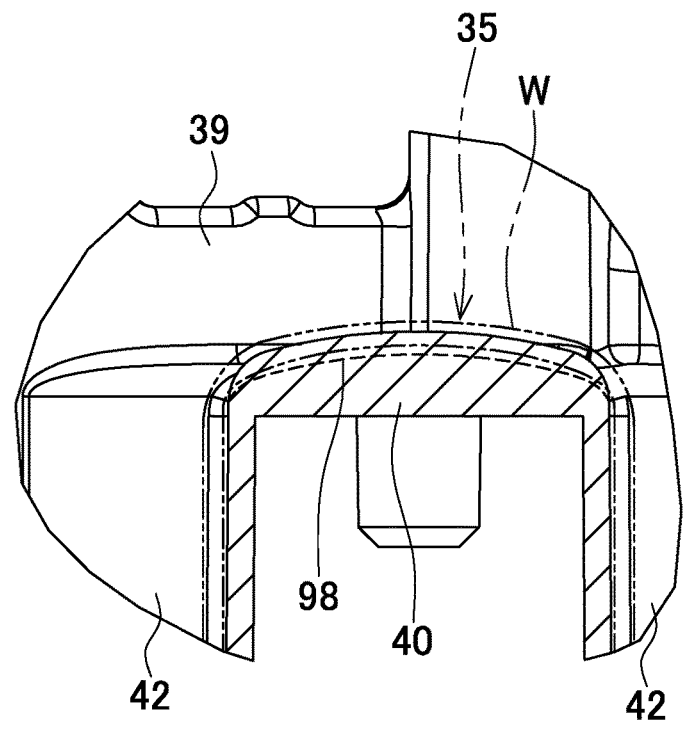
FIG. 15B is an enlarged view of region K of FIG. 15A.

Here as well, as shown at FIG. 14B, a first winding W1 of the magnet wire W is positioned as a result of being wound from a location outside the thin-walled portion 98 at the base of the insulating portion 40 of the front insulator 33. In addition, from a second winding W2, this is wound over the thin-walled portion 98 in crosswise fashion with respect thereto, an adjacent third winding W3, a fourth winding W4, . . . then being wound in order as progress is made toward the upwardly projecting portion 41. Winding of the magnet wire W at prescribed tension thus causes the magnet wire W to plastically deform the thin-walled portion 98 and dig into the thin-walled portion 98 at all locations about the circumference thereof. In the state that the first layer of the magnet wire W has been wound to reach the upwardly projecting portion 41, the U-shaped grooves 100, 100, . . . which conform to the external shape of the magnet wire W are formed continuously at the top face of the thin-walled portion 98.

As described above, when the deformable portion is formed to be the thin-walled portion 98 which is provided at the surface about which the magnet wire is wound at the insulating portion 40, because the area over which the magnet wire W digs thereinto is increased, it is possible to decrease the tendency for dislocation to occur after it has dug thereinto, making it possible to obtain a stable and neatly wound state thereat.

Furthermore, because here as well the thin-walled portion 98 is such that the sloped portion 99 is formed in such fashion that the thickness thereof gradually increases as progress is made in the direction in which the magnet wire W is neatly wound thereover, the end of the first layer (the eighth winding W8 and the ninth winding W9 at FIG. 14B) of the magnet wire W wound about the sloped portion 99 digs into the thin-walled portion 98 at gradually higher locations, as a result of which the beginning of the second layer (the tenth winding W10) of the magnet wire W wound thereabout will be wound starting from a location which is away from the upwardly projecting portion 41. It will therefore be possible to reduce the load acting in a direction tending to cause the upwardly projecting portion 41 to bend toward the rotor 31. The upwardly projecting portion 41 is, of course, also reinforced by the sloped portion 99. The sloped portion 99 also need not be curved but may incline in planar fashion. It is also possible to omit the sloped portion 99.

In addition, where the deformable portion takes the form of a deformable rib, instead of two, there may be three or more, or conversely there may be only one which is located at the center of the insulating portion. So long as it is at a surface about which the wire is wound, it need not be at the front of the insulating portion, and it is possible for the deformable rib(s) to be provided at the side(s) thereof. In such a case it is also possible to provide the deformable ribs at both the front and side(s) thereof. And with respect to the shape of the deformable rib, the two ends thereof may have corners or be radiused, or may be such that that the cross-sectional shape thereof is triangular, trapezoidal, or some other shape. Where a thin-walled portion is employed, there is no objection to reducing the width thereof, or conversely this may be provided over the full area of the surface about which the wire is wound.

Furthermore, the first winding of wire need not be wound from a location outside of the deformable portion, but may be wound instead from the deformable portion.

Moreover, whereas in the foregoing embodiments and variations thereon the deformable portions were provided only at the front insulator, it is also possible to provide these at only the rear insulator, and there is no objection to providing the deformable portions at the respective insulating portions of the front insulator and the rear insulator. The number of the insulating portions may be increased or reduced as appropriate in correspondence to the number of the teeth at the stator.

In addition, the sensor circuit board may be provided such that front and back are reversed, and connections to the lead wires may be made to the side of or behind the stator. Furthermore, the power tool motor is not limited to inner-rotor-type brushless motors, it being possible to employ an outer-rotor-type brushless motor, nor is it limited to brushless motors, it being possible to apply the present invention to commutated motors and other such wound motors.

Moreover, the power tool is not limited to impact drivers, it being possible to apply the present invention to driver drills, hammer drills, grinders, and other such tools.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A method of forming a coil in a power tool motor, the power tool motor comprising a stator core having a plurality of teeth that protrude therefrom in radial directions; an insulator which is attached to the stator core and which has a plurality of insulating portions that protrude therefrom along the direction of protrusion of the respective teeth; and a plurality of coils formed by wire wound about each of the insulating portions at the respective teeth, the method comprising:

providing at least a portion of a surface about which the wire is wound at the respective insulating portions in advance with a deformable portion which is capable of being deformed by tension of the wire wound thereabout; and winding the wire about the deformable portion to form the coils as the deformable portion is made to deform in correspondence to the external shape of the wire;

wherein the deformable portion is a deformable rib provided in erect fashion along the direction of protrusion of the insulating portion.

2. The method of forming a coil in a power tool motor according to claim 1, wherein the deformable rib is provided to be paired in erect fashion such that there is prescribed spacing therebetween in a direction crossing the protrusion of the insulating portion.

3. The method of forming a coil in a power tool motor according to claim 2, wherein a recess, at which a wall thickness of the insulating portion is less than at a portion outside of the deformable ribs, is formed between the deformable ribs.

4. The method of forming a coil in a power tool motor according to claim 2, wherein cross-sectional shapes of the deformable ribs are such that angular portions at which corners are apparent are formed at mutually outward sides at the top ends thereof, and radiused portions at which edges are not apparent are formed at mutually inward sides at the top ends thereof.

5. The method of forming a coil in a power tool motor according to claim 1, wherein the deformable rib is formed in such fashion that thickness thereof gradually increases as progress is made in a direction in which the wire is neatly wound thereover.

6. The method of forming a coil in a power tool motor according to claim 1, wherein the deformable portion is a thin-walled portion provided at the surface about which the wire is wound.

7. The method of forming a coil in a power tool motor according to claim 6, wherein the thin-walled portion is formed from a resin material which is different from that of the insulating portions.

8. The method of forming a coil in a power tool motor according to claim 1, wherein the insulator is one of two thereof that are attached to two ends of the stator core, and the deformable portion is at least provided at one of the two insulators.

9. A power tool motor comprising:

a stator core having a ring and a plurality of teeth that protrude radially inward from the ring;

an insulator that (1) is attached to the stator core and (2) has a plurality of insulating portions that protrude radially inward from the ring; and a plurality of coils formed by wire (1) wound about each of the insulating portions at the teeth and (2) having a cross-sectional shape; wherein:

at least a portion of surfaces about which the wire is wound at the insulating portions has a deformable portion which is capable of being deformed by tension of the wire wound thereabout; and the coils are formed by winding the wire around the each of the insulating portions such that (1) a portion of the deformable portions deforms in correspondence to an external shape of the wire as the wire is wound about the each of the insulating portions and (2) the wire maintains the cross-sectional shape.

10. A power tool, the power tool being equipped with a drive source in the form of a motor comprising a stator core having a plurality of teeth that protrude therefrom in radial directions; an insulator which is attached to the stator core and which has a plurality of insulating portions that protrude therefrom along the direction of protrusion of the respective teeth; and a plurality of coils formed by wire wound about each of the insulating portions at the respective teeth;

wherein at least a portion of a surface about which the wire is wound at the respective insulating portions of the insulator is provided with a deformable rib which is capable of being deformed by tension of the wire wound thereabout and which is provided in erect fashion along the direction of protrusion of the insulating portions; and wherein the coils are formed in a state such that a portion of the deformable rib at which the wire is wound thereabout has been made to deform in correspondence to the external shape of the wire.

11. The power tool according to claim 10, wherein the deformable rib is provided to be paired in erect fashion such that there is prescribed spacing therebetween in a width direction of the insulating portion.

12. A power tool, the power tool being equipped with a drive source in the form of a motor comprising a stator core having a plurality of teeth that protrude therefrom in radial directions; an insulator which is attached to the stator core and which has a plurality of insulating portions that protrude therefrom along the direction of protrusion of the respective teeth; and a plurality of coils formed by wire wound about each of the insulating portions at the respective teeth;

wherein at least a portion of a surface about which the wire is wound at the respective insulating portions of the insulator is provided with a deformable portion which is capable of being deformed by tension of the wire wound thereabout and which is formed in such fashion that thickness thereof gradually increases as progress is made in a direction in which the wire is neatly wound thereover; and wherein the coils are formed in a state such that a portion of the deformable portion at which the wire is wound thereabout has been made to deform in correspondence to the external shape of the wire.

* * * * *